May 5, 1964

F. V. MINGRONE 3,131,718

PRESSURE RELIEF VALVE

Filed Sept. 14, 1960

3,131,718
PRESSURE RELIEF VALVE
Frank V. Mingrone, Milford, Conn., assignor to Robertshaw Controls Company, Richmond, Va., a corporation of Delaware
Filed Sept. 14, 1960, Ser. No. 55,914
3 Claims. (Cl. 137—512.1)

This invention relates to pressure relief valves and in particular to a self-closing type valve to protect pressure vessels against excessive pressures.

It has been customary practice to immerse large high power electrical transformers in oil to provide means for cooling. Upon overload conditions, the rate of temperature increase may exceed the capacity of the cooling system, resulting in vaporization of the oil which in turn results in an increase in pressure of the gas above the surface of the oil. To prevent the increased pressure from rupturing the transformer casing, the vessel was exhausted by frangible portions which burst at predetermined pressures or by hinged-door type devices which unlocked at a predetermined pressure. In both cases, the devices remained open during which time the oil in the transformer components was subject to possible contamination and oxidation from atmospheric conditions. Closing and resealing of the transformer casing had to be accomplished manually. In order to overcome such difficulties, automatic reclosing valves were designed so as to be pressure responsive and rapid actuation was accomplished by means of a plurality of pressure areas requiring a plurality of sealing rings.

It is, therefore, an object of this invention to open a pressure vessel automatically and solely in accordance with increasing pressure inside the vessel.

A further object of this invention is to utilize a single pressure responsive means and a single sealing means for obtaining a rapid actuation for the opening of a pressure vessel.

Another object of this invention is to vent the sealing means of a pressure responsive valve downstream of the valve seat.

This invention has a further object in that the operating force for rapidly opening a pressure responsive valve is obtained by increasing gas pressure acting on a constant area.

In practicing this invention, a valve seat member surrounds an opening in a pressure vessel and carries a movable valve member for sealing such opening. The valve member is biased to a closed position and is pressure responsive for moving to an open position in response to excessive pressures in the vessel. The valve seat member is provided with means for venting the device to the atmosphere upon a slight initial movement of the valve member whereby additional movement is accomplished with a rapid actuation resulting from additional build-up in pressure inside of the vessel.

These and other advantages of the invention will become apparent from the following description taken in connection with the accompanying drawings wherein.

Figure 2:
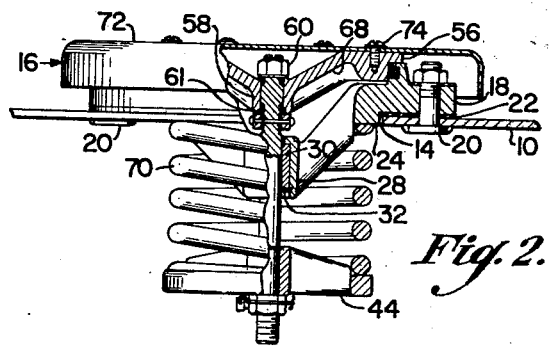
FIG. 2 is a detail, partly in section, of the valve means of FIG. 1 but shown on an enlarged scale.

Referring now to the drawings, there is shown a transformer casing 10 which serves as a container for a cooling oil 12 in which a transformer (not shown) is immersed in a manner well known in the art. The transformer casing 10 is provided with an opening 14 which is sealed closed by the pressure relief valve of this invention, indicated generally at 16.

The pressure relief valve 16 includes a valve seat body member 18 which is secured to the casing 10 as by nut and bolt assemblies 20 with an annular gasket 22 of suitable sealing material interposed between the body member 18 and the casing 10. The inner periphery of the body member 18 is provided with an annular shoulder 24 which extends into the casing opening 14 and which terminates in flush relationship with the casing. Body member 18 also forms the supporting rim for three inwardly and downwardly depending spokes 26 that integrally terminate in a hollow cylindrical hub member 28 which carries a bushing 30 held in place by means of a retaining ring 32.

Figure 5:
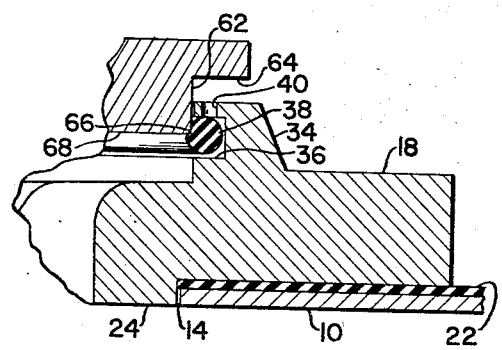
FIG. 5 is a cross section taken on line V—V of FIG. 4 but shown on an enlarged scale.

The top portion of the body member 18 is provided with an annular boss which serves as a fixed valve seat 34. As is illustrated in FIG. 5, the valve seat member 34 has a seating surface that is annularly recessed to form a groove 36 in which a conventional O-ring resilient seal 38 is disposed. The groove 36 has a larger cross-sectional area than the O-ring 38 so that when the valve is in the open position, the inner periphery of the O-ring 38 protrudes slightly out of the groove 36. The circumference of the valve seat member 34 is provided with a plurality of spaced apertures 40 which communicate with the annular groove 36. The apertures 40 are shown as extending perpendicularly through the lip defining the top of the annular groove 36, however, the particular location is immaterial as long as the apertures are vented downstream of the sealing surfaces as will be described hereinafter.

A valve stem 42 has a central portion slidably disposed within the bushing 30 for reciprocation therein. The lower end of the valve stem 42 carries a retainer plate 44 adjustably positioned thereon by means of an adjustment nut 46 that is locked in place by a set screw 48 which in turn is locked by a safety wire 50. The upper end of the valve stem 42 is provided with a jam nut 52 permanently fixed thereto by means of a rivet 54. A valve member 56 includes a centrally disposed cylinder 58 which is mounted on the upper end of the valve stem 42 and which is held against the jam nut by means of a retaining nut 60 whereby the valve member 56 and the valve stem 42 move as a unit. A gas-tight seal is effected between the valve member 56 and the jam nut 52 by means of an O-ring seal 61 of suitable resilient material. The valve member 56 comprises a sealing surface 62 which cooperates with the O-ring 38 and an annular flange forming a sealing surface 64 which overlies and seals the venting apertures 40. As illustrated in FIG. 5 O-ring 38 has an inside diameter less than the outside diameter of cylindrical surface 62 of valve member 56. Thus, when surface 62 is in the position illustrated in FIG. 5, a space is provided between the lower and side walls of groove 36 and O-ring 38 permitting the pressure in tank 10 to be vented around the O-ring and through apertures 40. The sealing surface 62 is provided with a nose edge 66 which engages the O-ring seal 38 upon initial movement of the valve member 56. The valve member 56 has an undersurface 68 which is pressure responsive to the pressure conditions existing within the casing 10. A coil spring 70 is mounted in compression between the shoulder 24 of the valve seat body 18 and the spring retainer 44 whereby the valve member 56 is normally biased to a closed position by a spring force which may be adjusted by the nut 46. A cup-shaped member 72 is secured to the top of valve member 56 as by screws 74 for unitary movement therewith. The member 72 has a larger diameter than the body member 18 and covers the same as protection against the weather elements.

In operation of this device, the coil spring 70 biases the valve member 56 to a closed position as is illustrated in FIG. 2 with the sealing surface 62 engaging the O-ring 38 and the sealing surface 64 sealing the venting apertures 40. Excessive transformer temperatures cause a vaporization of the oil 12 which in turn increases the pressure on the valve surface 68 for moving the same against the bias of the coil spring 70. When the gas pressure exceeds a predetermined value, the valve member 56 is initially moved to a position indicated in FIG. 5 wherein sealing contact is maintained between the valve nose 66 and the O-ring 38 by the gas pressure behind the O-ring 38, which is vented to the atmosphere by means of the apertures 40. At this point of valve operation, the exhaust through the venting apertures 40 may be sufficient to relieve the pressure in casing 10 permitting the valve member 56 to close under the bias of spring 70. Such an arrangement has particular advantage in those installations which include an alarm device (not shown) to be actuated when the relief valve is opened. Thus, momentary pressure relief in the casing 10 may be accomplished without complete opening of the relief valve and without actuating the alarm device.

In the event the gas pressure continues to increase, the valve operating force will be increased solely in response to the pressure in casing 10 since the pressure area 68 remains constant. Due to the initial valve movement, the casing 10 is being continuously exhausted through the apertures 40 so that further valve opening movement requires the gas pressure to exceed a second predetermined value. Thus, the valve member 56 is retained in the position shown in FIG. 5 until the second predetermined pressure value is attained, at which time the valve member 56 is moved with a rapid actuation because the valve has only to move from the position illustrated in FIG. 5 to the position illustrated in FIG. 3. With such an arrangement, the gas pressure is exhausted to the atmosphere and the subsequent lowering of the pressure in the casing 10 permits the valve member 56 to reclose in response to the bias of the coil spring 70.

Figure 3:
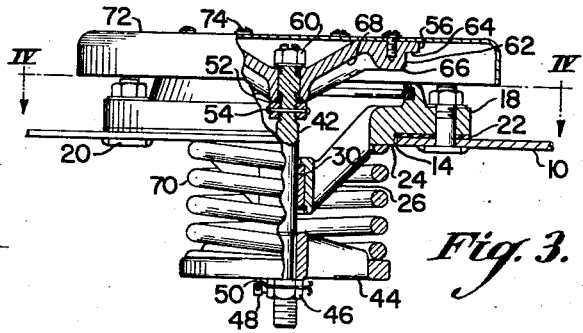
FIG. 3 is a view similar to FIG. 2 showing the valve open position.
Figure 1:
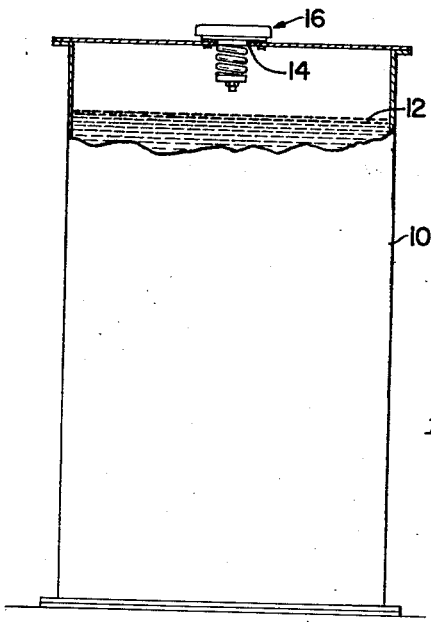
FIG. 1 is an elevation, partly in section, of apparatus embodying this invention.
Figure 4:
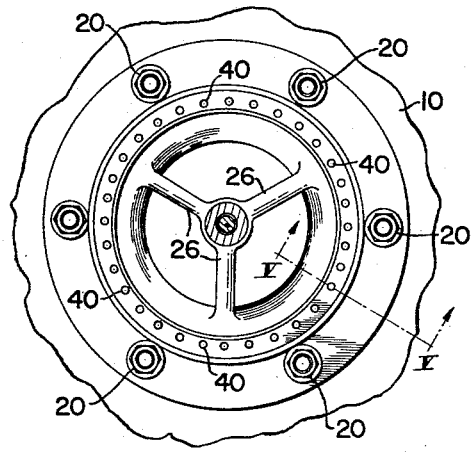
FIG. 4 is a cross section taken on line IV—IV of FIG. 3.

Inasmuch as the sealing surface 64 closes the venting apertures 40 when the valve is in the closed position, the pressure build-up in the casing 10 permits initial movement of the valve member 56 which will exhaust excessive gas pressures within a predetermined limit. Accordingly, the valve member 56 may be automatically reclosed to its position illustrated in FIG. 2 if such exhaust is sufficient to reduce the pressure to a point below the valve closing position. However, should the vaporization of the oil 12 continue, because of excessive transformer temperatures, the resulting increase in gas pressure will cause movement of the valve member 56 to its fully open position as is illustrated in FIG. 3.

Inasmuch as various modification and reversals of parts may be made, it is intended that the foregoing description and drawings of the above embodiment be interpreted as illustrative and not in a limiting sense.

I claim:

1. A pressure relief valve comprising a valve seat member with an opening therethrough for fluid flow, an annular groove in the wall of said opening, an annular resilient seal in said annular groove, vent means in said annular groove communicating with the downstream side of said opening, a valve having a cylindrical portion slidably engaged in said opening and of a greater diameter than the inner diameter of said annular resilient seal for controlling flow through said opening, said valve having a flange on the downstream side of said opening extending radially and operable to close said vent means for controlling flow through said vent means, said annular resilient seal in said groove having a cross-sectional area less than the cross-sectional area of said groove, and means biasing said valve to a closed position preventing flow through said opening and said vent means, said valve being movable in response to a predetermined upstream pressure to an initial position permitting flow through said vent means only, and being further movable in response to a higher predetermined upstream pressure to an open position permitting flow through said opening.

2. A pressure relief valve comprising a valve seat member having a passage therethrough for fluid flow, an annular groove in the wall of said passage, apertures in said groove communicating with the downstream side of said valve seat member, a resilient seal in said groove having an inner diameter less than the diameter of said passage and a cross-sectional area less than the cross-sectional area of said groove, a valve having a cylindrical portion slidable in said passage and of a diameter greater than the inner diameter of said seal and a flange engageable with the downstream side of said valve seat member and of a diameter sufficient to close said apertures, means biasing said valve to a closed position in which the cylindrical portion encloses the groove and compresses the seal into said groove and the flange closes said apertures, said valve being movable to an initial position in response to a predetermined increase in upstream pressure in which the edge of said cylindrical portion engages said seal and said groove is exposed to upstream pressure permitting flow through said apertures only, and movable upon further increases in upstream pressure to open said passage.

3. A pressure relief valve comprising a valve seat member with an opening therethrough for fluid flow, an annular groove in said opening, a plurality of apertures in said groove communicating with one side of said valve seat member, a valve member having a cylindrical portion slidable in said opening and an annular flange, means biasing said valve member to a closed position with said cylindrical portion closing said annular groove and said annular flange closing said apertures, an annular resilient seal in said groove having an inside diameter less than the outside diameter of said cylindrical portion and a cross-sectional area less than the cross-sectional area of said groove, said valve member being movable to an initial position in response to a predetermined pressure in which said seal engages the lower edge of said cylindrical portion permitting limited flow around said seal and through said apertures, and further movable in response to a second higher predetermined pressure to a fully open position in which said cylindrical portion moves out of said opening permitting flow through said opening.

References Cited in the file of this patent

UNITED STATES PATENTS

| | | |
|---|---|---|
| 2,072,271 | Meadows | Mar. 2, 1937 |
| 2,574,054 | Miller | Nov. 6, 1951 |
| 2,713,989 | Bryant | July 26, 1955 |
| 2,742,921 | Halford | Apr. 24, 1956 |
| 2,940,472 | Chilcoat | June 14, 1960 |